US009623765B2

(12) United States Patent
Liu

(10) Patent No.: US 9,623,765 B2
(45) Date of Patent: Apr. 18, 2017

(54) ELECTRIC VEHICLE DRIVING RANGE OPTIMIZATION SYSTEM WITH DYNAMIC FEEDBACK

(71) Applicant: Atieva, Inc., Menlo Park, CA (US)

(72) Inventor: Albert Liu, Palo Alto, CA (US)

(73) Assignee: ATIEVA, INC., Menlo Park, CA (US)

( * ) Notice: Subject to any disclaimer, the term of this patent is extended or adjusted under 35 U.S.C. 154(b) by 0 days.

(21) Appl. No.: 14/746,916

(22) Filed: Jun. 23, 2015

(65) Prior Publication Data

US 2016/0375786 A1    Dec. 29, 2016

Related U.S. Application Data

(63) Continuation-in-part of application No. 14/746,881, filed on Jun. 23, 2015.

(51) Int. Cl.
| | | |
|---|---|---|
| *B60L 11/00* | (2006.01) | |
| *B60L 11/18* | (2006.01) | |
| *B60K 35/00* | (2006.01) | |

(52) U.S. Cl.
CPC .......... *B60L 11/1861* (2013.01); *B60K 35/00* (2013.01); *B60L 2250/16* (2013.01); *B60L 2250/30* (2013.01)

(58) Field of Classification Search
CPC .... B60L 2260/52; B60L 1/02; B60L 11/1861; B60L 11/1862; B60L 2240/12; B60L 2250/01; B60L 2250/306; Y02T 10/705; Y02T 90/16; Y02T 10/7005; Y02T 10/7044; B60K 35/00

USPC .... 701/22, 36, 102, 423; 320/112, 132, 136; 903/903, 906, 907; 180/65.1, 60
See application file for complete search history.

(56) References Cited

U.S. PATENT DOCUMENTS

| | | | | |
|---|---|---|---|---|
| 2009/0114463 A1* | 5/2009 | DeVault | ................ | B60K 6/365 180/65.29 |
| 2010/0072954 A1* | 3/2010 | Kohn | ................... | H02J 7/0091 320/152 |
| 2011/0153140 A1* | 6/2011 | Datta | ...................... | B60R 16/02 701/31.4 |
| 2012/0109408 A1* | 5/2012 | Siy | ........................... | B60L 1/02 701/1 |
| 2012/0143410 A1* | 6/2012 | Gallagher | ........... | B60L 11/1861 701/22 |
| 2013/0166123 A1* | 6/2013 | Donald, III | .............. | B60L 1/02 701/22 |
| 2014/0074329 A1* | 3/2014 | Yang | .................. | B60L 11/1861 701/22 |
| 2014/0379183 A1* | 12/2014 | Long | .................... | B60W 40/12 701/22 |

(Continued)

*Primary Examiner* — Marthe Marc-Coleman
(74) *Attorney, Agent, or Firm* — Patent Law Office of David G. Beck

(57) ABSTRACT

A method is provided that aids the driver of an electric vehicle (EV) in optimizing their car's driving range by allowing the driver to request range optimization help from the EV's control system. In response to the request, the system provides the driver with one or more recommendations as to how to increase vehicle range, recommendations such as lowering top speed, altering the temperature settings of the car's HVAC system, etc. Additionally, the system provides the driver with real time driving range feedback, thereby helping the driver to evaluate the various recommendations and determine which approach is best suited to the current conditions.

22 Claims, 10 Drawing Sheets

(56) References Cited

U.S. PATENT DOCUMENTS

2015/0051763 A1\* 2/2015 Enomoto ............ B60L 11/1862
701/22
2015/0057916 A1\* 2/2015 Ishii .................. G01C 21/3469
701/123
2015/0291036 A1\* 10/2015 Ryu ........................ B60L 1/00
701/22

\* cited by examiner

ELECTRIC VEHICLE DRIVING RANGE OPTIMIZATION SYSTEM WITH DYNAMIC FEEDBACK

CROSS-REFERENCE TO RELATED APPLICATION

This application is a continuation-in-part of U.S. patent application Ser. No. 14/746,881, filed 23 Jun. 2015, the disclosure of which is incorporated herein by reference for any and all purposes.

FIELD OF THE INVENTION

The present invention relates generally to an electric vehicle and, more particularly, to a system and method that aid range optimization in an electric vehicle.

BACKGROUND OF THE INVENTION

In response to the demands of consumers who are driven both by ever-escalating fuel prices and the dire consequences of global warming, the automobile industry is slowly starting to embrace the need for ultra-low emission, high efficiency cars. While some within the industry are attempting to achieve these goals by engineering more efficient internal combustion engines, others are incorporating hybrid or all-electric drive trains into their vehicle line-ups. To meet consumer expectations, however, the automobile industry must not only achieve a greener drive train, but must do so while maintaining reasonable levels of performance, range, reliability, safety and cost.

The most common approach to achieving a low emission, high efficiency car is through the use of a hybrid drive train in which an internal combustion engine (ICE) is combined with one or more electric motors. While hybrid vehicles provide improved gas mileage and lower vehicle emissions than a conventional ICE-based vehicle, due to their inclusion of an internal combustion engine they still emit harmful pollution, albeit at reduced levels compared to conventional vehicles. Additionally, due to the inclusion of both an internal combustion engine and an electric motor(s) with its accompanying battery pack, the drive train of a hybrid vehicle is typically much more complex than that of either a conventional ICE-based vehicle or an all-electric vehicle, resulting in increased cost and weight. Accordingly, several vehicle manufacturers are designing vehicles that only utilize an electric motor, or multiple electric motors, thereby eliminating one source of pollution while significantly reducing drive train complexity.

The electric drive trains used in electric vehicles (EVs) have proven to be highly reliable and capable of providing exceptional performance. Unfortunately car sales for EVs have proven to be lower than one would expect, especially given the performance and reliability of these cars. It appears that these sluggish sales are due, at least in part, to the concerns of some potential buyers regarding an EV's driving range. Additionally, many drivers are unaware of, or do not fully understand, the impact of ambient temperature, driving style and vehicle usage on driving range. Accordingly, what is needed is a system that is capable of providing the user with a way to both optimize and quickly ascertain the effects of ambient temperature, driving style and vehicle usage on driving range. The present invention provides such a system.

SUMMARY OF THE INVENTION

The present invention provides a method of providing range optimization aid to a driver of an electric vehicle (EV), the method comprising the steps of (i) monitoring the current battery pack charge level; (ii) determining the current driving range based on the current battery pack charge level and a predefined set of battery drainage rules; (iii) determining a first battery pack drain due to operation of the electric drive train; (iv) determining a second battery pack drain due to operation of at least one user controllable auxiliary system, where the at least one user controllable auxiliary system is electrically coupled to the battery pack; (v) modifying the current driving range to yield a modified driving range, where the modifying step is based on the first battery pack drain and the second battery pack drain; (vi) displaying the modified driving range on a display mounted within the electric vehicle; (vii) accepting a user request via a user interface for a suggestion to increase the modified driving range, wherein the user request is accepted by a system controller of the EV; and (viii) communicating the suggestion to the driver of the EV, where the system controller performs the communicating step, where the suggestion provides a recommendation for adjusting a current vehicle condition to obtain an increased driving range, and where the communicating step may utilize the EV's display or audio system. The step of accepting a user request may utilize a touch-screen input system, a voice activated input system, a push-button switch and/or a capacitive switch as the user interface. The method may further include the steps of (i) determining a prediction of the increased driving range, where the step of determining the prediction of the increased driving range is performed by the system controller prior to the driver executing the suggestion, and where the prediction of the increased driving range is based on the driver adjusting the current vehicle condition in accordance with the suggestion; and (ii) displaying the prediction of the increased driving range on the display prior to the driver executing the suggestion. The method may further include the steps of (i) determining a prediction of the increased driving range, where the step of determining the prediction of the increased driving range is performed by the system controller prior to the driver executing the suggestion, and where the prediction of the increased driving range is based on the driver adjusting the current vehicle condition in accordance with the suggestion; (ii) calculating the difference between the prediction of the increased driving range and the modified driving range, where the step of calculating the difference is performed by the system controller prior to the driver executing the suggestion; and (iii) displaying the difference between the prediction of the increased driving range and the modified driving range on the display prior to the driver executing the suggestion. Preferably the monitoring, determining, modifying and displaying steps are updated at a frequency of at least once every 10 seconds.

In one aspect, the method may further include the steps of (i) accepting a category request via the user interface, where the category request is accepted by the EV's system controller; and (ii) selecting the current vehicle condition from a plurality of range extending categories in response to the category request.

In another aspect, the method may further include the step of selecting the current vehicle condition from a plurality of range extending categories in response to a predefined category selection order. The predefined category selection order may be set by the driver, the EV's manufacturer or by a third party.

In another aspect, the current vehicle condition may correspond to a driving behavior, e.g., vehicle speed.

In another aspect, the current vehicle condition may correspond to a setting of the at least one user controllable auxiliary system. In at least one embodiment, the at least one user controllable auxiliary system may be comprised of a heating, ventilation and air conditioning (HVAC) system coupled to the EV's passenger cabin and the setting may correspond to a HVAC temperature setting. In at least one embodiment, the at least one user controllable auxiliary system may be comprised of at least one of an external lighting system, an internal lighting system, and a vehicle entertainment system.

In another aspect, the step of determining the first battery pack drain may further include the step of determining the EV's current vehicle speed and estimating the first battery pack drain from the current vehicle speed. The current vehicle speed may be averaged over a preset period of time (e.g., less than 5 minutes) and the first battery drain may be based on this current average vehicle speed.

In another aspect, the step of determining the first battery pack drain may further include the steps of (i) determining the EV's current vehicle speed, (ii) determining the EV's current degree of incline; and (iii) estimating the first battery pack drain from the current vehicle speed and the current degree of vehicle incline. The current vehicle speed may be averaged over a preset period of time (e.g., less than 5 minutes) and the first battery drain may be based on this current average vehicle speed and the current degree of vehicle incline. The current vehicle speed may be averaged over a preset period of time (e.g., less than 5 minutes) and the EV's current degree of incline may be averaged over a preset period of time (e.g., less than 5 minutes), thus allowing the first battery drain to be based on the current average vehicle speed and the current average degree of vehicle incline.

In another aspect, the step of determining the second battery pack drain may further include the step of applying a preset set of rules to the at least one user controllable auxiliary system. In at least one embodiment, the at least one user controllable auxiliary system may be comprised of a heating, ventilation and air conditioning (HVAC) system coupled to the EV's passenger cabin and the method may further include the steps of (i) determining a first ambient temperature corresponding to the EV's external environment; (ii) determining a second ambient temperature corresponding the internal temperature of the EV's passenger cabin; (iii) monitoring a user set HVAC temperature setting; and (iv) determining the second battery pack drain based on the first ambient temperature, the second ambient temperature, the user set HVAC temperature setting, and the preset set of rules.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

DESCRIPTION OF THE SPECIFIC EMBODIMENTS

Figure 1:
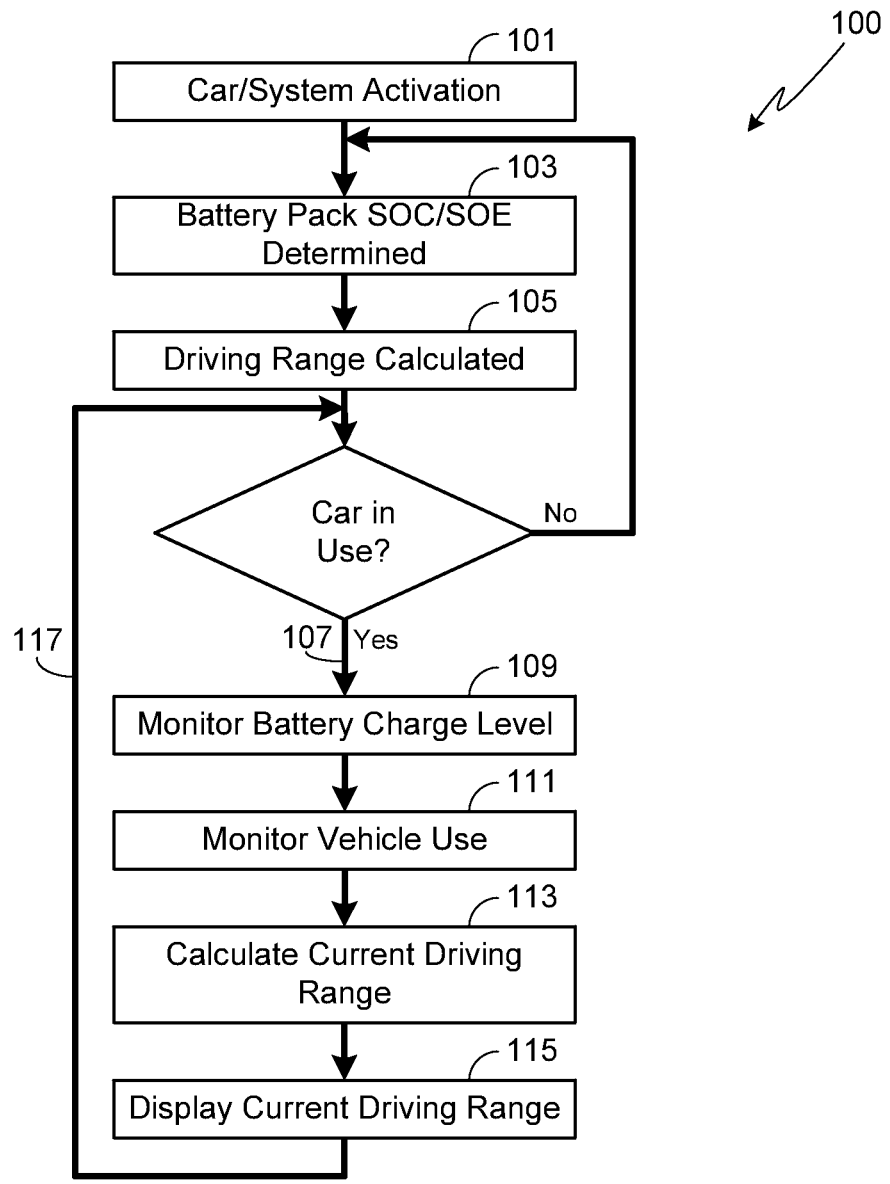
FIG. 1 illustrates the basic methodology of the invention.

As used herein, the singular forms "a", "an" and "the" are intended to include the plural forms as well, unless the context clearly indicates otherwise. The terms "comprises", "comprising", "includes", and/or "including", as used herein, specify the presence of stated features, process steps, operations, elements, and/or components, but do not preclude the presence or addition of one or more other features, process steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps, calculations, or components, these steps, calculations, or components should not be limited by these terms, rather these terms are only used to distinguish one step, calculation, or component from another. For example, a first calculation could be termed a second calculation, and, similarly, a first step could be termed a second step, and, similarly, a first component could be termed a second component, without departing from the scope of this disclosure.

In the following text, the terms "battery", "cell", and "battery cell" may be used interchangeably and may refer to any of a variety of different battery configurations and chemistries. Typical battery chemistries include, but are not limited to, lithium ion, lithium ion polymer, nickel metal hydride, nickel cadmium, nickel hydrogen, nickel zinc, and silver zinc. The term "battery pack" as used herein refers to an assembly of one or more batteries electrically interconnected to achieve the desired voltage and capacity, where the battery assembly is typically contained within an enclosure. The terms "electric vehicle" and "EV" may be used interchangeably.

While it is clearly understood that driving an EV will drain the battery pack and thus cause a decrease in driving range, most EV owners and potential EV buyers have only a limited understanding of the effects of vehicle speed on range, much less the effect that operation of an auxiliary system may have on the battery pack and thus driving range.

In a conventional vehicle, the user typically monitors the gas gauge rather than worrying about how car speed lowers their vehicle's fuel efficiency due to increased wind resistance. With respect to auxiliary systems such as exterior and interior lighting, the entertainment system and/or the heating, ventilation and air conditioning (HVAC) system, use of these systems have little, if any, effect on the driving range of a conventional, internal combustion engine (ICE) based vehicle. Only the HVAC system, which may utilize a belt-driven compressor, is likely to affect the conventional car's range, and then only when the compressor is running (i.e., not due to fan use). In marked contrast, use of these electrically powered auxiliary systems in an EV will add an additional load on the battery pack, thereby increasing battery drain and decreasing driving range. Concerns relating to limited driving range become even more worrisome as the battery pack state-of-charge (SOC) and state-of-energy (SOE) decreases, especially in light of the amount of time that is often required in order to charge a battery pack.

In order to improve the EV user experience and provide valuable insight into EV operation and the interplay between driving range and car use, the present invention provides a real time feedback system. FIG. 1 illustrates the basic methodology of one embodiment of the invention, the first step of which is system initiation (step 101). In at least one embodiment, system initiation occurs when the user turns on their vehicle, for example by pressing an "on" button or otherwise activating the car. In at least one alternate embodiment, system initiation is programmed to occur when a driver is identified and is in close proximity to the car, where driver recognition may use any of a variety of devices and a variety of different communication techniques. For example, a driver may be recognized based on his or her smart phone or key fob, and using a communication technique such as radio-frequency identification (RFID) or a Bluetooth communication system.

Once activated (step 101), the current battery pack's charge level (e.g., SOC or SOE) is determined (step 103) and the current driving range is calculated based on the battery pack's charge level (step 105). At this stage, driving range is based on the current charge level and a preset set of rules that yield a rate of expected battery drain from multiple assumptions such as top speed, mix of speeds, expected rates of acceleration/deceleration, mix of flat and gradient roadways, expected variations in roadway elevation, etc. Once the car is in use (step 107), for example by placing the car in drive, the control system continues to motor the battery pack's current charge level (step 109) while also monitoring how the car is actually being used (step 111). Actual use is determined by monitoring the vehicle systems that impact battery loading, e.g., motor, lights, entertainment system, HVAC, etc., and in particular by monitoring the battery drain (e.g., rate of decrease in battery pack SOC/SOE) caused by each of these systems. In addition to directly measuring the battery loading due to the motor, an estimate of the motor induced battery drain may be determined from the vehicle speed, for example by using a look-up table that provides an estimate of the battery drain due to the motor for each of a plurality of vehicle speeds. In some embodiments in addition to vehicle speed, the look-up table may also base battery drain on whether the vehicle is traveling on a level roadway or going uphill or downhill. Since the degree of road incline will affect battery loading by the motor, preferably the look-up table will also base battery drain on road incline, where road incline may be provided by a data base, for example one associated with the vehicle's GPS system, or measured using a tilt sensor (i.e., inclinometer) mounted within the car.

Based on the current charge level (step 109) and the current monitored use (step 111), the control system then calculates the current driving range (step 113). Preferably the current driving range is displayed (step 115), thus allowing the driver to not only monitor the car's current range, but also note how the range varies depending upon driving style (e.g., top speed, rate of acceleration, rate of deceleration) and auxiliary system settings (e.g., HVAC temperature and fan settings, exterior/interior lights, entertainment system settings, display brightness, etc.). The car's current driving range may be displayed numerically, e.g., remaining miles or kilometers, or graphically, e.g., bar graph or other graphic.

After the car is in use, the system controller continually updates the current driving range (step 117) based on current charge level (step 109) and the current monitored use (step 111). The driving range is preferably updated at a sufficient rate to allow the driver to immediately see the effects of modifying their driving style, auxiliary system settings or both. Preferably driving range is updated on the order of every second; alternately, every 5 seconds; alternately, every 10 seconds. It will be appreciated that this information may be updated at a different frequency (e.g., once per minute) as long as the system updates the driving range at a sufficient rate to provide the driver with up-to-date driving range information as settings and driving style are varied.

In most instances when the driver alters their driving behavior or makes a change to an auxiliary system setting, e.g., turning the car's fog lights off or on, the process illustrated in FIG. 1 is able to accurately determine and display the change in driving range based on the modified behavior/setting. Unfortunately in those instances when the change in question is continually being modified, the driving range information provided by process 100 may be changing too quickly to be of significant value to the driver. For example, if the driver is rapidly varying their speed between 35 mph and 85 mph, the driving range will also vary rapidly. Although a possible solution would be to decrease the update frequency and average battery use over a preset period of time, this approach is undesirable since it would prevent the driver from quickly determining the effect of a making a setting change to an auxiliary system or a similar vehicle characteristic in which averaging is undesirable.

Figure 2:
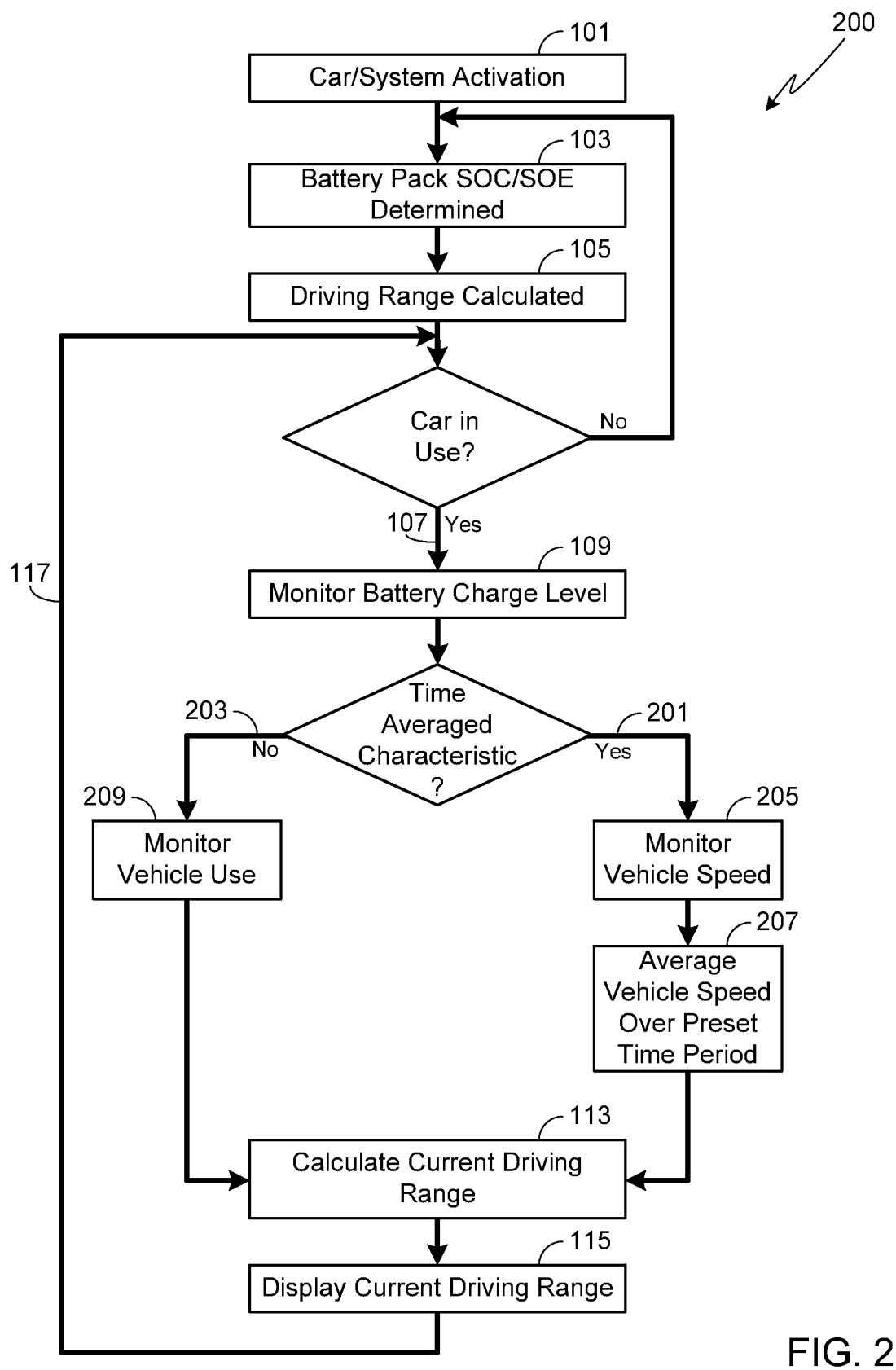
FIG. 2 illustrates a modified methodology based on the process of FIG. 1.

To overcome the undesired effects noted above with respect to averaging over time, preferably the methodology illustrated in FIG. 2 is used in which the system controller differentiates between those systems and driver behaviors that affect battery loading and that should be averaged over time, and those in which averaging is not desirable. In a typical configuration only vehicle speed is averaged since this is the primary driving characteristic that may be changed rapidly and repeatedly over time, for example based on road conditions, speed limits, and driver behavior. Since it is still desirable for the driver to be able to quickly observe the effects on driving range that making other vehicle system setting changes may make, in this process the system controller distinguishes between characteristics that should be time averaged (step 201) and those that should not be time averaged (step 203). Therefore in this example in which only variations in driving speed are time averaged, when the characteristic in question is driving speed, i.e., a characteristic that should be time averaged (step 201), the vehicle speed is monitored (step 205) and averaged over a preset period of time (step 207). Typically the preset time period over which vehicle speed is averaged is selected to be in the range between 30 seconds and a few minutes, although it will be appreciated that other time periods may be used for time averaging. In contrast to vehicle speed, other characteristics that affect battery loading and that should not be time averaged (step 203) are monitored directly, for example by monitoring the battery loading (e.g., rate of decrease in battery pack SOC/SOE) caused by each of these systems (step 209). Exemplary systems that are not time averaged include vehicle lighting (e.g., internal or external vehicle lights), the vehicle's entertainment system, and the HVAC system (e.g., fan settings, temperature settings, AC operation, etc.). Next, as in the prior method, the system controller calculates the current driving range (step 113) based on the current charge level (step 109) and the current battery load, where the current battery load is either time averaged (e.g., driving speed) or not time averaged (e.g., auxiliary systems usage). The updated driving range is then presented to the driver, for example on a display system (step 115).

While the primary use of an averaging function is to smooth out driving range variations due to the driver varying the car's speed, it will be appreciated that this or a similar approach may be used with other user modifiable aspects of the vehicle. For example, the user may wish to alter the HVAC temperature settings relative to the ambient temperature in the hopes of reducing auxiliary system use, thereby increasing driving range. However, a typical HVAC system will automatically adjust fan settings as well as turn on and off the heating and air conditioning (A/C) systems based on the cabin temperature relative to the HVAC temperature settings input by the user. As a result, the driving range is not only dependent upon the HVAC temperature settings input by the user, but also dependent upon the current mode of operation (i.e., fan speed, A/C operation, etc.). Accordingly, in at least one embodiment of the invention, the system controller applies a preset set of rules to each of the monitored systems. As a result, this smart system is able to more accurately gauge driving range based on modifications made by the driver to either driving style or auxiliary system settings. Process 300, shown in FIG. 3, illustrates such a method.

Figure 3:
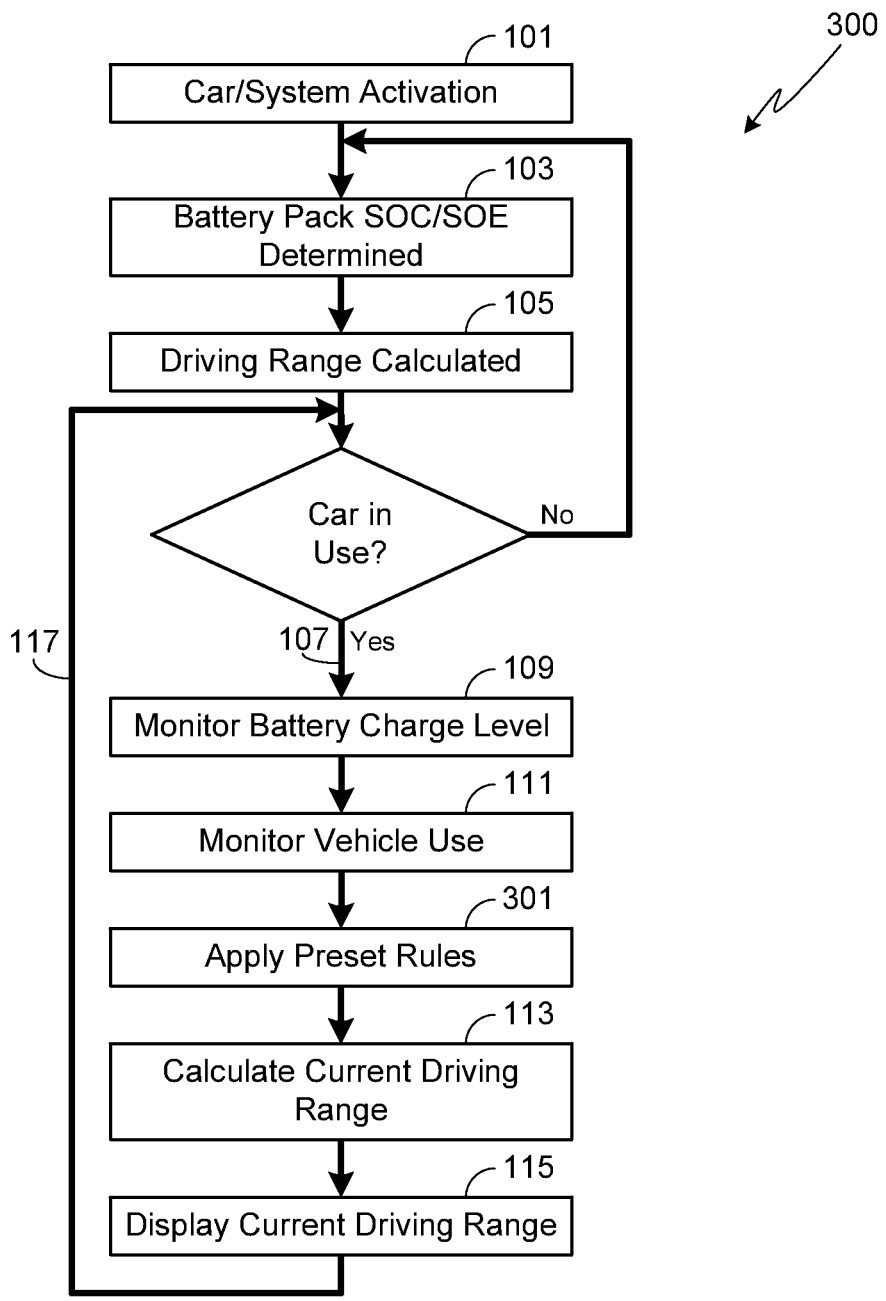
FIG. 3 illustrates a modified methodology based on the process of FIG. 1.

As shown in FIG. 3, the methodology of this embodiment is similar to that previously described except that a set of preset rules are applied (step 301) to the settings and conditions monitored in step 111. The set of rules applied in step 301 may include event averaging, for example averaging vehicle speed over a preset time period as described above relative to process 200. The set of rules applied in step 301 may also be applied to changes in HVAC settings, for example providing a table of battery loading data based on the difference between the HVAC temperature setting input by the user and the ambient temperature. Preferably if the user over-rides the automatic operation of the HVAC system, for example by manually setting the fan speed, then the set of rules applied in step 301 are automatically modified in order to take into account this change. It will be appreciated that for some monitored systems, the system controller may directly calculate the battery load based on the user settings rather than applying a preset set of rules. For example, if the user turns on or off the entertainment system, adjusts display settings (e.g., screen brightness, sleep modes, etc.) and/or adjusts vehicle lighting, the system controller may be configured to calculate the battery load based on the latest setting.

Figure 4:
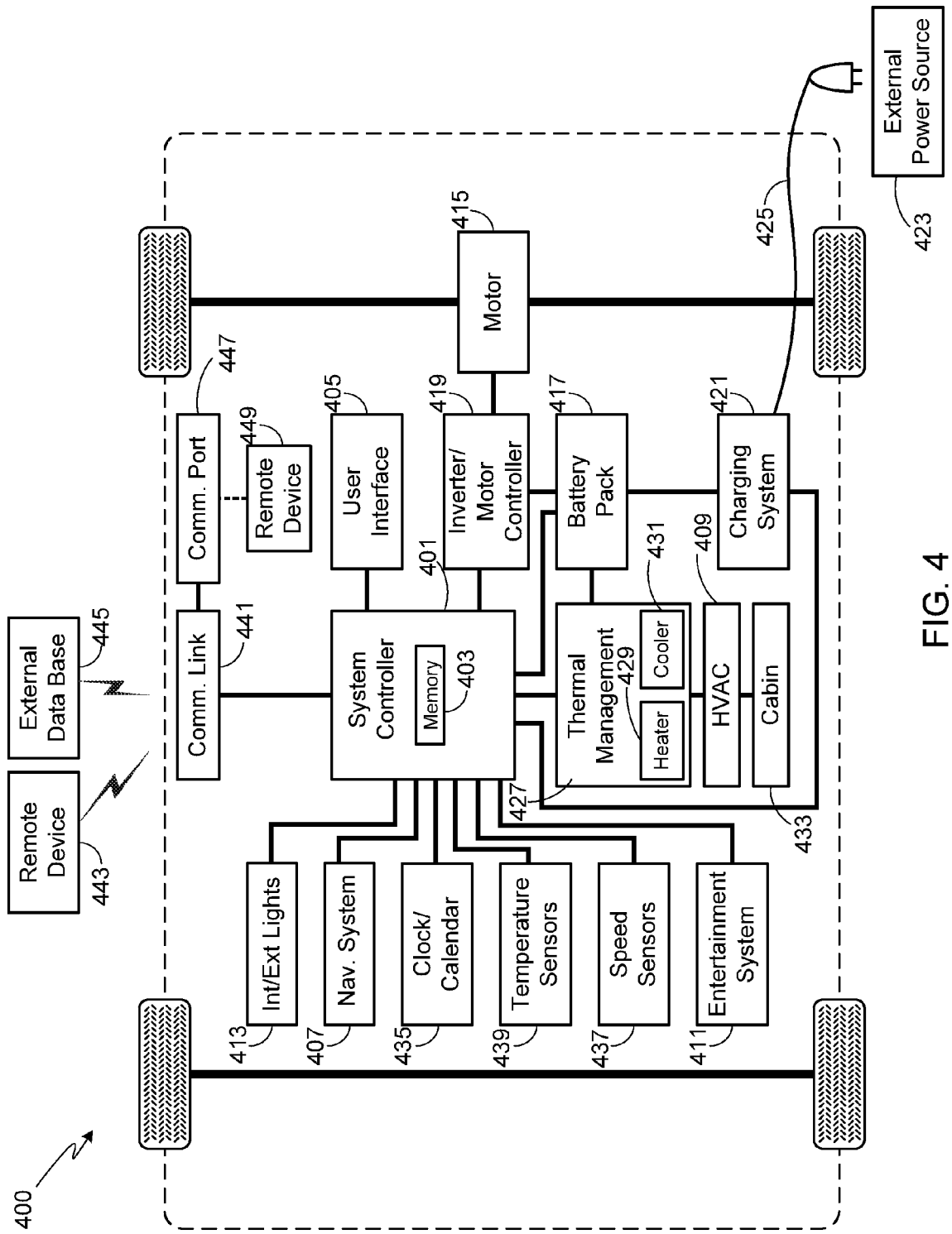
FIG. 4 provides a system level diagram of the primary EV systems utilized in at least one embodiment of the invention.

FIG. 4 is a high-level view of an EV 400 and the primary systems used in a driving range optimization system used in accordance with the invention. It should be understood that the system configuration illustrated in FIG. 4 is but one possible configuration and that other configurations may be used while still retaining the functionality of the invention. Additionally, one or more of the elements shown in FIG. 4 can be grouped together in a single device, and/or circuit board, and/or integrated circuit.

Vehicle 400 includes a system controller 401 comprised of a central processing unit (CPU). Preferably system controller 401 is integral to the vehicle management system. System controller 401 also includes memory 403, with memory 403 being comprised of EPROM, EEPROM, flash memory, RAM, solid state drive, hard disk drive, or any other type of memory or combination of memory types. A user interface 405 is coupled to system controller 401. Interface 405 allows the driver, or a passenger, to interact with various aspects of vehicle control, for example inputting data into navigation system 407, altering settings for HVAC system 409, adjusting and controlling the vehicle's entertainment system 411 (e.g., radio, CD/DVD player, etc.), adjusting and controlling the vehicle's internal/external lights 413, and/or otherwise altering the functionality of vehicle 400. Preferably interface 405 also includes means for the control system to provide information to the driver, specifically the current driving range. Additionally, interface 405 may also be used to provide information such as a navigation map or driving instructions as well as the operating performance of any of a variety of vehicle systems (e.g., battery pack charge level, selected gear, current entertainment system settings such as volume level and selected track information, external light settings, current vehicle speed, current HVAC settings such as cabin temperature and/or fan settings, etc.). Interface 405 may also be used to warn the driver of a vehicle condition (e.g., low battery charge level) and/or communicate an operating system malfunction (battery system not charging properly, charging cable not connected properly, low tire air pressure, malfunctioning light, etc.). Interface 405 may be comprised of a single interface, for example a touch-screen display, or a combination of user interfaces such as push-button switches, capacitive switches, slide or toggle switches, gauges, display screens, visible and/or audible warning indicators, etc. It will be appreciated that if user interface 405 includes a graphical display as preferred, controller 401 may also include a graphical processing unit (GPU), with the GPU being either separate from or contained on the same chip set as the CPU.

Vehicle 400 includes a propulsion source 415 that is comprised of one or more motors. The vehicle's propulsion source 415 may be mechanically coupled to the front axle/wheels, the rear axle/wheels, or both, and may utilize any of a variety of transmission types (e.g., single speed, multi-speed) and differential types (e.g., open, locked, limited slip).

Energy is supplied to the motor(s) in source 415 by a battery pack 417. Battery pack 417, which may be comprised of one or hundreds or thousands of rechargeable batteries, is also used to supply the energy necessary for the various vehicle systems that require electrical power (e.g., lights, entertainment systems, navigation system, etc.). Typically battery pack 417 is coupled to the motor(s) 415 via a power control system 419 (i.e., an inverter and motor controller) that insures that the energy delivered to the drive motor is of the proper form (e.g., correct voltage, current, waveform, etc.).

Battery pack 417 is charged by a charging system 421. Preferably charging system 421 is integrated into vehicle 400 as shown, although an external charging system may also be used with vehicle 400. Charging system 421 is configured to be electrically connected to an external source 423, such as a municipal power grid, typically by using a power cord 425. In at least one configuration, charging system 421 is wirelessly connected to external source 423, for example using an inductive charging pad over which vehicle 400 is parked. Battery pack 417 may also be charged, at least in part, using an on-board charging system such as a regenerative braking system.

Vehicle 400 includes a thermal management system 427 that includes both a heating subsystem 429 and a cooling subsystem 431. Utilizing HVAC system 409, thermal management system 427 may be used to maintain the passenger cabin 433 within the desired temperature range as well as to insure that the batteries within battery pack 417 are maintained within the batteries' desired operating, charging and/or storage temperature ranges. When system 427 is used to control the temperature of battery pack 417, the system may utilize heated or cooled air, circulating the heated or cooled air throughout the battery pack; alternately, a coolant circulation system may be thermally coupled to the battery pack, where the coolant is heated by heater 429 or cooled by cooler 431 as required.

As disclosed above when describing one aspect of the invention, system controller 401 may be used to monitor a variety of subsystems as well as various conditions relating to driver behavior. This information can then be used to determine current driving range as noted above as well as provide driving range optimization suggestions as described in detail below. In order to provide this information, system controller 401 not only monitors battery pack charge levels, but also a variety of other vehicle conditions and subsystems. For example, the system may be configured to monitor the length of time that the battery pack has been in use with a clock/calendar subsystem 435, thereby allowing system controller 401 to adjust battery conditions based on system age. It will be appreciated that while the clock/calendar subsystem 435 is shown as a separate subsystem, typically this function is embedded in system controller 401. System controller may also monitor vehicle speed using sensors 437. Additionally, system controller 401 may be coupled to a variety of temperature sensors 439. Temperature sensors 439 may be used to monitor ambient temperature, thereby allowing system controller 401 to determine expected HVAC battery loads based on the difference between the ambient temperature and the HVAC temperature settings. Temperature sensors 439 may also monitor battery temperature, where battery temperature may be monitored at the individual battery level; alternately, battery temperature may be monitored for a group of batteries, for example batteries mounted within the pack in close proximity to one another; alternately, battery temperature may be based on the temperature of the thermal transfer fluid (e.g., coolant) used by thermal management system 427 to control battery pack temperature; alternately, battery temperature may be based on the temperature of the air exiting the battery pack. It should be understood that other techniques may be used to monitor battery/battery pack temperature and the invention is not limited to a specific technique.

In at least one embodiment, coupled to system controller 401 is a communication link 441. Communication link 441 may be used to provide a communication link between the system controller 401 and a user device or system 443, for example the user's smartphone, tablet, personal digital assistant (PDA), computer, etc. Communication link 441 may also be used to wirelessly obtain configuration updates from an external data source (e.g., manufacturer, dealer, service center, web-based application, remote home-based system, third party source, etc.) and/or access an external data base 445, for example a data base maintained by the car's manufacturer or a third party. Link 441 may use any of a variety of different technologies (e.g., GSM, EDGE, UMTS, CDMA, DECT, WiFi, WiMax, etc.).

In some embodiments, communication link 441 may also include an on-board port 447, such as a USB, Thunderbolt, or other port. Port 447 allows communication between system controller 401 and a user device or system 449 (e.g., smartphone, tablet, personal digital assistant (PDA), computer, etc.) over a wired communication link.

Regardless of the technique used to determine current driving range, the inventor envisions that under certain scenarios an EV driver may find that their car's present driving range is insufficient to reach their desired location, or that the present driving range does not exceed the desired driving range by a reasonable margin of safety/comfort. While a driver knowledgeable in the complex trade-offs between driving range and either driving behavior or auxiliary system use might be expected to make reasonable adjustments to their driving style and/or auxiliary system settings in order to increase their driving range, most EV owners do not have sufficient knowledge to make these same adjustments. Accordingly in at least one embodiment of the invention, the system controller is configured to help the driver to make adjustments to their driving style and/or auxiliary system settings in order to extend their driving range as desired.

Figure 5:
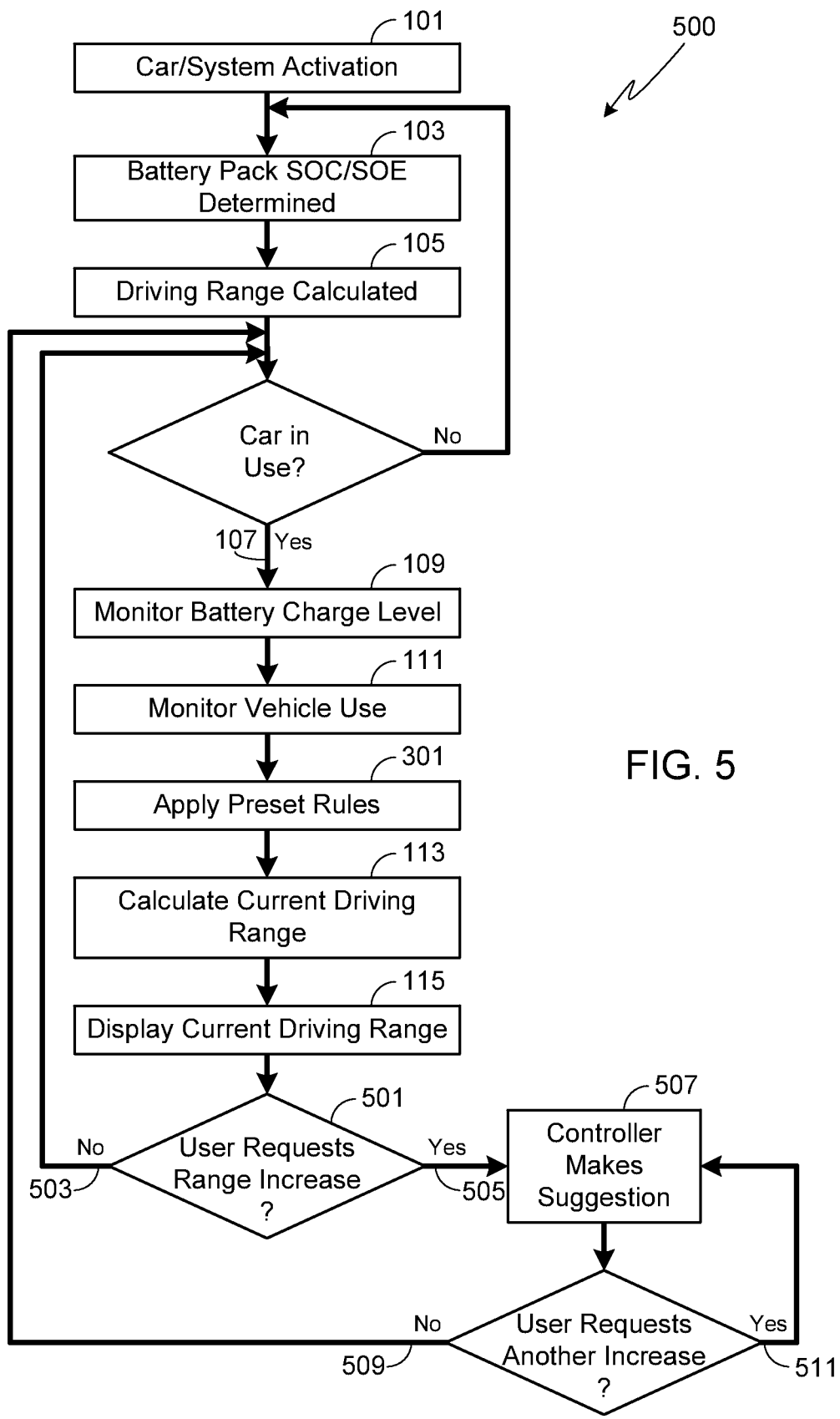
FIG. 5 illustrates the basic methodology of a preferred embodiment that allows the user to request range extending suggestions.

FIG. 5 illustrates the basic methodology of another embodiment of the invention in which the system controller 401 is configured to offer suggestions to the driver as to ways to increase driving range. As described in further detail below, the system controller may be configured to suggest system and/or behavior adjustments as a means of increasing driving range in response to a user request, or in response to the battery pack's charge level falling to a preset level, or to the vehicle's driving range reaching a preset minimum range, or to the vehicle's driving range being insufficient to reach a designated location. It should be understood that while the following methods are presented as modifications to process 300, they are equally applicable to either of the procedures illustrated in FIGS. 1 and 2.

In process 500, as in the previously described methods, the system controller continually updates the driving range (step 113) and provides that information to the driver (step 115). Whenever desired, the driver can request that the system controller provide a suggestion as to how to increase driving range (step 501). Preferably this request is input via user interface 405, for example using a touch-screen display, a push-button switch, a capacitive switch, or voice activated control. If the user does not request range optimization (step 503), then the process continues as described above. If, however, the user requests range optimization (step 505), then system controller 401 provides a suggestion as to one approach of increasing range (step 507). If the user does not request any additional suggestions (step 509), then the process continues to simply provide updated driving range information to the user (step 115). If the user does request an additional suggestion as to a way to extend the driving range (step 511), then system controller 401 provides another suggestion as to an approach for extending the driving range. This process may continue indefinitely.

When the user requests (steps 505, 511) that the system controller 401 provide a suggestion as to a possible range extending change in either driving behavior or an auxiliary system setting, the system controller may provide that information (step 507) visually via a display screen coupled to the user interface, or audibly using the car's audio system or a dedicated audio system. Preferably the suggestion provided by the system controller includes both the suggested change to be made as well as the predicted driving range if the user were to adopt the suggested change. The predicted driving range information may be given as a new driving range, the expected increase in driving range, or both. For example, the system controller may suggest decreasing speed to 70 mph for an increase in range of 30 miles and a total driving range of 50 miles. Alternately, the system controller may suggest increasing the HVAC temperature setting to 75° F. for a predicted new driving range of 35 miles. Alternately, the system controller may suggest turning off the seat warmers for a predicted increase in driving range of 10 miles. It should be understood that these are but three exemplary suggestions that system controller 401 could make to the driver, and other suggested changes may be made regarding other systems or other driver behavior.

As described above, in step 507 the system controller provides a suggestion as to a change in either the driving behavior (e.g., top speed, etc.) or to a setting for one of the vehicle's auxiliary systems (e.g., HVAC, entertainment, lighting, etc.) that the driver may use to extend the car's current driving range. In one configuration, system controller 401 provides the user with at least two range extending categories to select from prior to making the range extending suggestion. For example, the system controller may be configured to allow the user to select between adjusting the top speed and altering an auxiliary system setting. Once the user selects from the offered categories, system controller 401 provides a suggestion within the selected category for either altering driver behavior or an auxiliary system in order to extend driving range. Thus, for example, if the controller provides the user with three categories to select from, specifically top speed, HVAC settings, and 'other', and the user selects top speed, then controller 401 will provide a suggestion for lowering top speed (e.g., to 65 mph) in order to extend the driving range (e.g., to 48 miles, or to increase driving range by 11 miles). Similarly, if the user had selected one of the other two categories, the system controller would have provided a range extending suggestion within that selected category.

In at least one embodiment, system controller 401 follows a preset order for making suggested changes, where the order may be preset by the vehicle manufacturer, the driver, the vehicle owner, and/or a third party (e.g., service technician). For example, the order may be preset to make a range extending suggestion based initially on top speed, then a HVAC system setting suggestion, then a suggestion regarding another auxiliary system. Alternately, the system may be configured to only make range extending suggestions relating to a single auxiliary system (e.g., HVAC setting) or a preselected group of auxiliary systems (e.g., entertainment and lighting systems).

Figure 6:
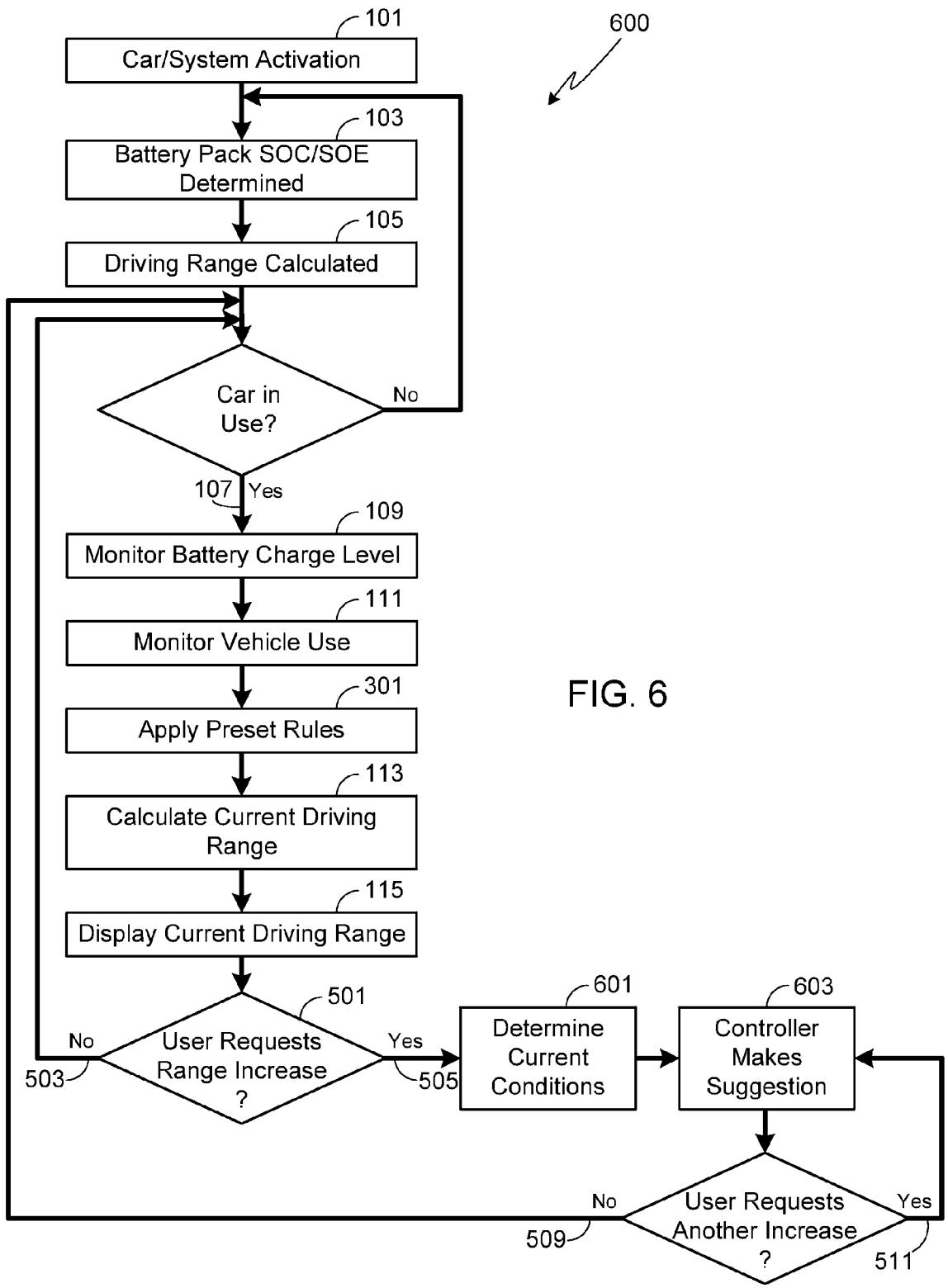
FIG. 6 illustrates a modification of the methodology shown in FIG. 5 in which the system monitors current conditions and issues range extending suggestions in light of those conditions.

FIG. 6 illustrates a modification of the embodiment shown in FIG. 5 which is equally applicable to the procedures illustrated in FIGS. 1 and 2. As shown, once the user requests (steps 505, 511) that system controller 401 provide a suggestion as to a possible range extending change in either driving behavior or an auxiliary system setting, system controller 401 determines current conditions (step 601). Current conditions may be comprised of posted speed limits, current ambient temperature (i.e., external air temperature), external light levels (e.g., day time versus night time), weather conditions (e.g., dry, raining, snowing), etc. The current conditions monitored by the control system may be obtained using on-board sensors, such as an ambient temperature sensor or a precipitation sensor, or may use communication link 441 to contact a remote data base 445 that may provide speed limits, weather reports, etc. Once the current conditions are determined (step 601), system controller 401 provides the user with a suggestion as to a possible range extending change (step 603) that is tailored to the current conditions determined in step 601. As a result, controller 401 only provides the user with suggestions that are reasonable in light of current conditions. For example, the vehicle may be currently traveling at a speed of 85 mph on a highway with a posted speed limit of 60 mph. In such a situation while it would be reasonable to suggest lowering the vehicle speed to 60 mph, thereby extending driving range, it would not be reasonable to suggest lowering the vehicle speed to lower than the posted speed. Similarly, it would not be reasonable for the system controller to suggest turning off the exterior lights in order to extend driving range if the car is traveling at night.

Figure 7:
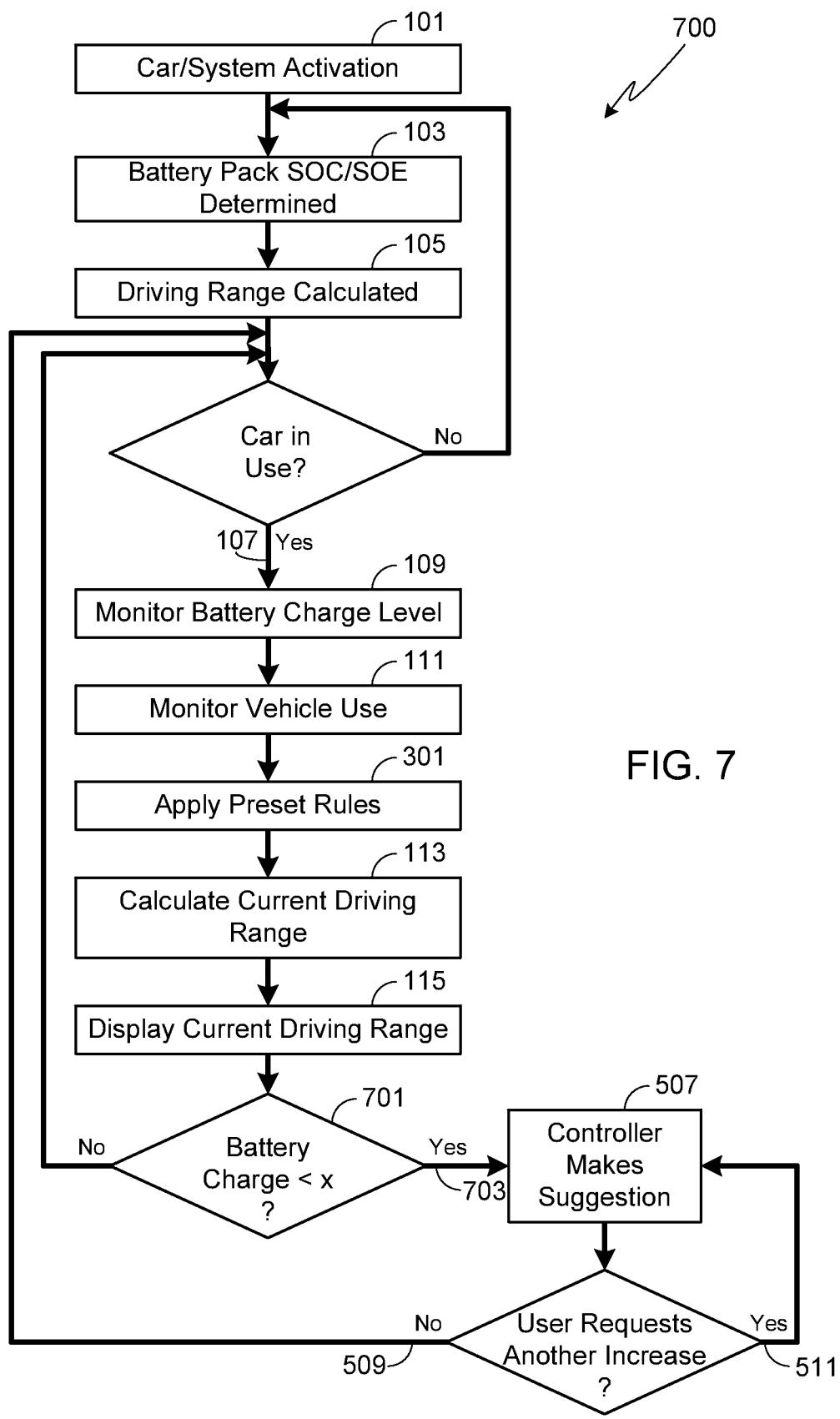
FIG. 7 illustrates a modification of the methodology shown in FIG. 5 in which the system automatically issues range extending suggestions when the battery pack charge level falls below a preset level.

As previously noted, the system controller can be configured to provide suggestions for extending driving range based on input other than a user request. For example, the embodiment illustrated in FIG. 7 is similar to that shown in FIG. 5 except that the system controller automatically suggests a possible range extending change when the controller determines in step 701 that the battery charge level (e.g., SOC/SOE) has fallen below a preset level. The system may be configured to allow the preset battery charge level used in step 701 to be preset by the vehicle manufacturer, the driver, the vehicle owner, or a third party (e.g., service technician). Once it is determined that the battery charge level has fallen below the preset level, the system controller provides a suggestion (step 507) as to a change that can be made to the driving behavior (e.g., top speed, etc.) or to a setting for one of the vehicle's auxiliary systems (e.g., HVAC, entertainment, lighting, etc.) in order to extend the car's current driving range. If the user does not request any additional suggestions (step 509), then the process continues to simply provide updated driving range information to the user (step 115). If the user does request an additional suggestion as to ways to extend the driving range (step 511), then system controller 401 provides another suggestion as to an approach for extending the driving range. This process may continue indefinitely. It should be understood that this approach of the system automatically providing range extending suggestions in response to a low battery charge level is equally applicable to the procedures illustrated in FIGS. 1 and 2 as well as the smart system described relative to FIG. 6.

Figure 8:
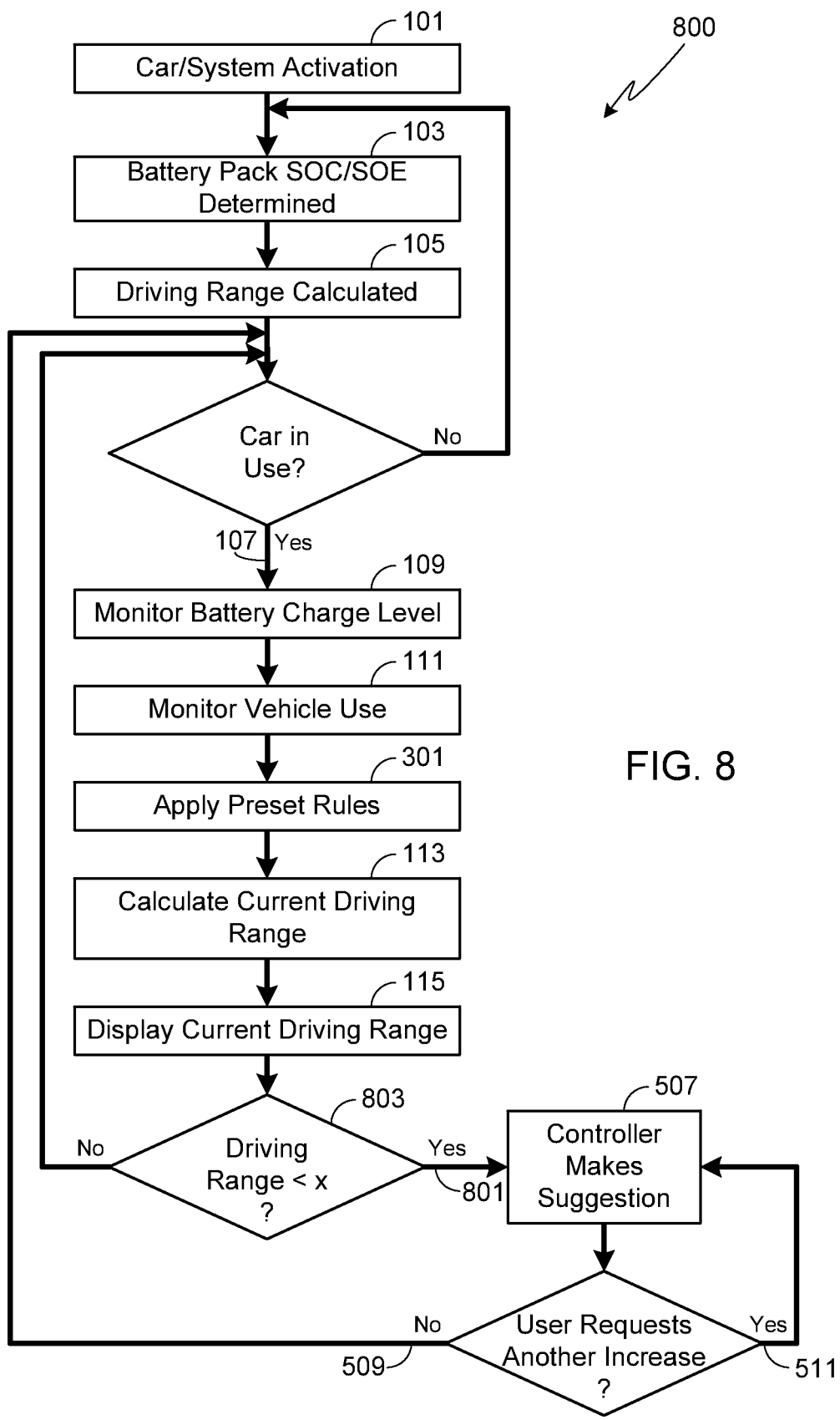
FIG. 8 illustrates a modification of the methodology shown in FIG. 5 in which the system automatically issues range extending suggestions when the current driving range falls below a preset level.

In an alternate embodiment, rather than automatically providing range extending suggestions in response to battery charge levels, the system illustrated in FIG. 8 automatically makes suggestions when the driving range falls below a preset level (step 801). The system may be configured to allow the preset range used in step 803 to be preset by the vehicle manufacturer, the driver, the vehicle owner, or a third party (e.g., service technician). In this embodiment, during step 803 the system controller compares the preset range to the vehicle's current driving range as determined in step 113. If the current driving range is less than the preset range (step 801), then the system will automatically make suggestions as to ways to extend the driving range by altering driving behavior or auxiliary system settings. As previously described relative to procedure 700, the user can either request additional suggestions (step 511) or not (step 509). It should be understood that procedure 800 is equally applicable to the procedures illustrated in FIGS. 1 and 2 as well as the smart system described relative to FIG. 6.

Figure 9:
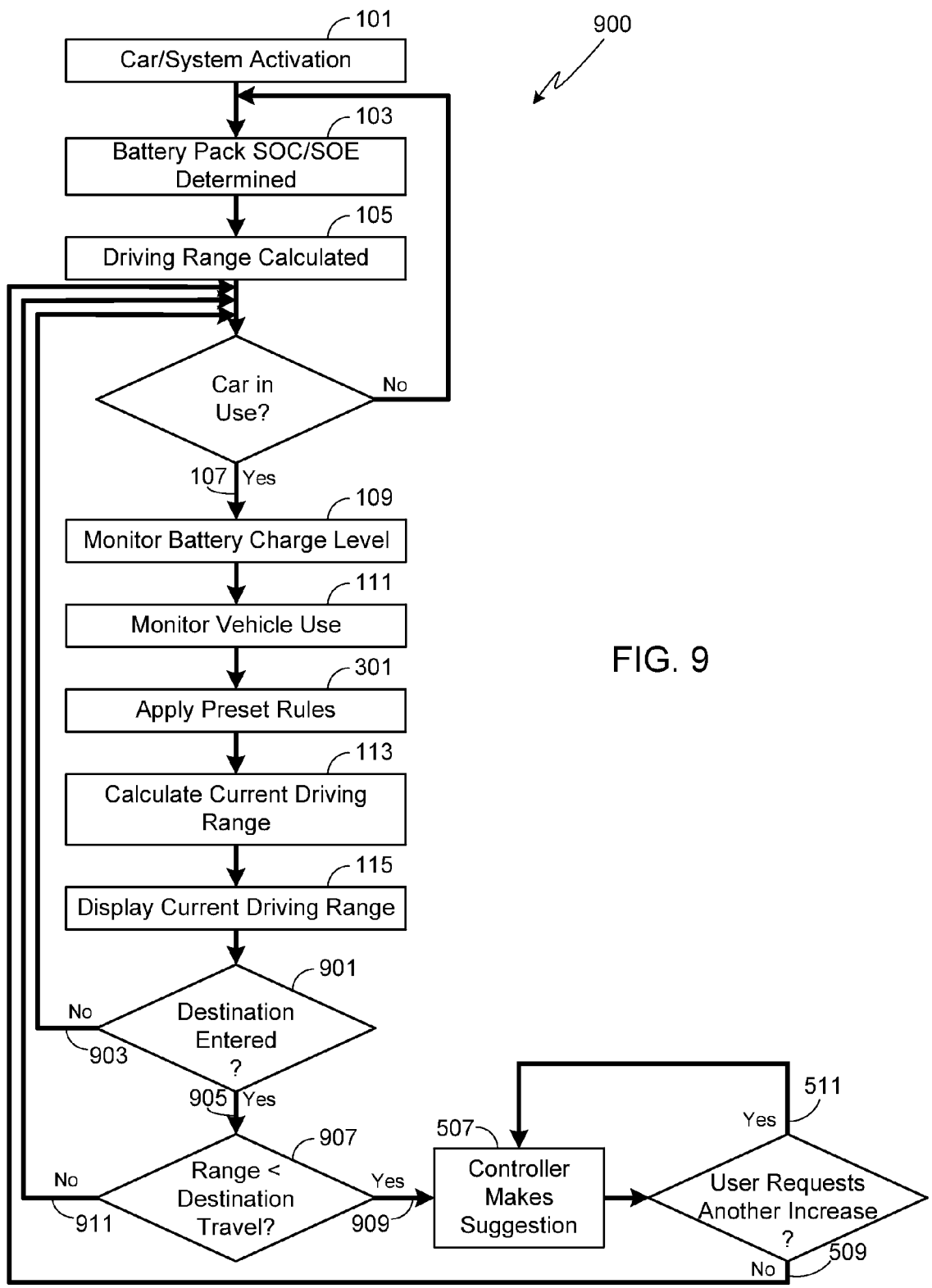
FIG. 9 illustrates a modification of the methodology shown in FIG. 5 in which the system automatically issues range extending suggestions when the current driving range is insufficient to reach a designated destination.

FIG. 9 illustrates another embodiment of the invention based on the procedures shown in FIGS. 3 and 5. In process 900, as in the methods described relative to FIGS. 1-3, the system controller continually updates the driving range (step 113) and provides that information to the driver (step 115). In step 901, the system controller determines whether or not a destination has been entered into the system, for example by entering a destination into navigation system 407. If no destination has been entered (step 903), then the system continues to operate as described relative to FIGS. 1-3. If a destination has been entered into the system (step 905), then system controller 401 compares the distance to the entered destination to the vehicle's current driving range (step 907). If the current driving range is less than that required to travel to the entered destination (step 909), then the system controller will provide a suggestion as to how to increase driving range (step 507) as described above. In at least one embodiment, a safety margin is added to the travel distance such that the system provides its range improving suggestion when the current driving range plus the safety margin becomes less than the distance between the vehicle's current location and the entered destination. If the user does not request any additional suggestions (step 509), then the process continues to simply provide updated driving range information to the user (step 115). If the user does request an additional suggestion as to ways to extend the driving range (step 511), then system controller 401 provides another suggestion as to an approach for extending the driving range. This process may continue indefinitely. It should be understood that this approach of the system automatically providing range extending suggestions in response to the present driving range being less than that required to reach an entered destination is equally applicable to the procedures illustrated in FIGS. 1 and 2 as well as the smart system described relative to FIG. 6.

Figure 10:
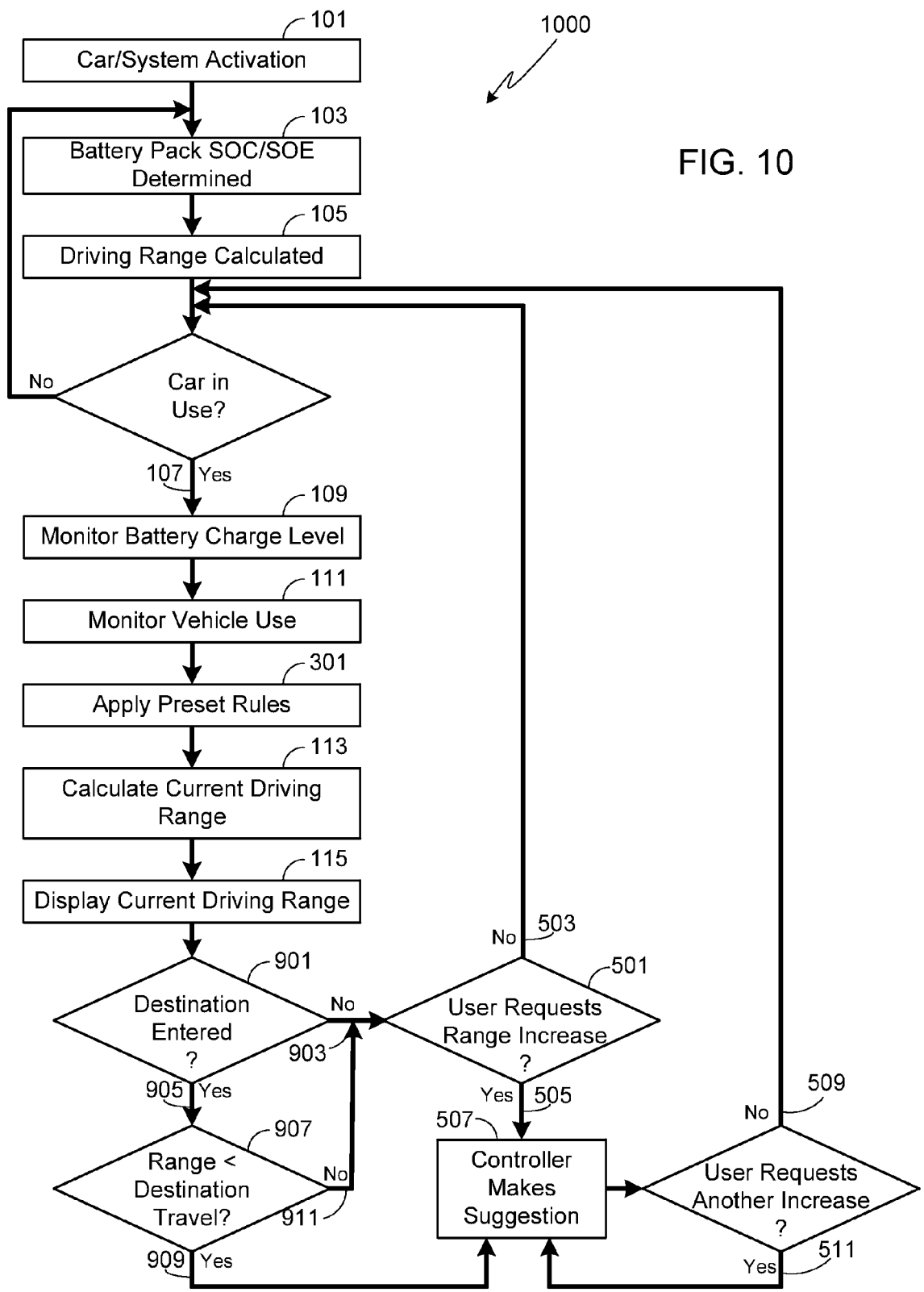
FIG. 10 illustrates a modification of the methodology shown in FIG. 9 that allows the user to request range extending suggestions.

It should be understood that the inventor envisions that the system can be configured to allow the system controller to automatically provide range extending suggestions, for example based on battery charge levels (e.g., process 700), current driving range (e.g., process 800), and/or current driving range compared to required range to reach a pre-designated destination (e.g., process 900), while still allowing the user to request range extending suggestions at will. For example and as described above relative to process 900, the process shown in FIG. 10 automatically provides range extending suggestions once the current range is less than that required to travel to a pre-designated destination. In addition, even if no destination has been entered (step 903) or if the current driving range is greater than required (step 911), the user is still able to enter a request (step 501) for the system controller to provide range extending suggestions.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A method of providing range optimization aid to a driver of an electric vehicle, wherein said electric vehicle is comprised of a battery pack coupled to an electric drive train, said method comprising:

presetting a presentation order for a plurality of range extending recommendations, wherein each range extending recommendation of said plurality of range extending recommendations corresponds to a vehicle condition selected from the group of vehicle conditions consisting of driving behavior, heating, ventilation and air conditioning (HVAC) system settings, and auxiliary system settings, wherein said presentation order is preset in a system controller of said electric vehicle;

monitoring a current battery pack charge level;

determining a current driving range based on said current battery pack charge level and a predefined set of battery drainage rules;

determining a first battery pack drain due to operation of said electric drive train;

determining a second battery pack drain due to operation of at least one user controllable auxiliary system, wherein said at least one user controllable auxiliary system is electrically coupled to said battery pack;

modifying said current driving range to yield a modified driving range, wherein said modifying step is based on said first battery pack drain and said second battery pack drain;

displaying said modified driving range on a display, wherein said display is mounted within said electric vehicle;

accepting a user request via a user interface for a suggestion to increase said modified driving range, wherein said user request is accepted by said system controller of said electric vehicle; and communicating a first range extending recommendation to said driver of said electric vehicle in response to said user request, wherein said system controller performs said communicating step, wherein said first range extending recommendation corresponds to a first adjustment of one of said group of vehicle conditions to obtain an increased driving range, wherein selection of said first range extending recommendation is preset by said presentation order, and wherein if said first range extending recommendation is rejected by said driver, said method further comprising:

accepting a second user request via said user interface for a second suggestion to increase said modified driving range, wherein said second user request is accepted by said system controller of said electric vehicle; and communicating a second range extending recommendation to said driver of said electric vehicle in response to said second user request, wherein said system controller performs said communicating step, wherein said second range extending recommendation corresponds to a second adjustment of one of said group of vehicle conditions to obtain said increased driving range, and wherein said second range extending recommendation is preset by said presentation order.

2. The method of claim 1, further comprising:

determining a prediction of said increased driving range, wherein said step of determining said prediction of said increased driving range is performed by said system controller prior to said driver executing said range extending recommendation, and wherein said prediction of said increased driving range is based on said driver adjusting said current vehicle condition in accordance with said range extending recommendation; and displaying said prediction of said increased driving range on said display, wherein said step of displaying said prediction of said increased driving range is performed prior to said driver executing said range extending recommendation.

3. The method of claim 1, further comprising:

determining a prediction of said increased driving range, wherein said step of determining said prediction of said increased driving range is performed by said system controller prior to said driver executing said range extending recommendation, and wherein said prediction of said increased driving range is based on said driver adjusting said current vehicle condition in accordance with said range extending recommendation;

calculating a difference between said prediction of said increased driving range and said modified driving range, wherein said step of calculating said difference is performed by said system controller prior to said driver executing said range extending recommendation; and displaying said difference between said prediction of said increased driving range and said modified driving range on said display, wherein said step of displaying said difference is performed prior to said driver executing said range extending recommendation.

4. The method of claim 1, wherein said driver performs said step of presetting said presentation order.

5. The method of claim 1, wherein a manufacturer of said electric vehicle performs said step of presetting said presentation order.

6. The method of claim 1, wherein a third party performs said step of presetting said presentation order.

7. The method of claim 1, said step of accepting said user request utilizing at least one of a touch-screen input system, a voice activated input system, a push-button switch and a capacitive switch as said user interface.

8. The method of claim 1, said communicating step further comprising displaying said range extending recommendation on said display.

9. The method of claim 1, said communicating step further comprising audibly communicating said range extending recommendation via a vehicle audio system.

10. The method of claim 1, wherein said driving behavior corresponds to a vehicle speed.

11. The method of claim 1, wherein said at least one user controllable auxiliary system is comprised of at least one of an external lighting system, an internal lighting system, and a vehicle entertainment system.

12. The method of claim 1, wherein said monitoring, determining, modifying and displaying steps are updated at a frequency of at least once every 10 seconds.

13. The method of claim 1, wherein said step of determining said first battery pack drain further comprises determining a current vehicle speed corresponding to said electric vehicle and estimating said first battery pack drain from said current vehicle speed.

14. The method of claim 13, further comprising averaging the current vehicle speed over a preset period of time to yield a current average vehicle speed, wherein said first battery drain is based on said current average vehicle speed.

15. The method of claim 14, wherein said preset period of time is less than 5 minutes.

16. The method of claim 1, wherein said step of determining said first battery pack drain further comprises:

determining a current vehicle speed corresponding to said electric vehicle;

determining a current degree of vehicle incline corresponding to said electric vehicle; and estimating said first battery pack drain from said current vehicle speed and said current degree of vehicle incline.

17. The method of claim 16, further comprising averaging the current vehicle speed over a preset period of time to yield a current average vehicle speed, wherein said first battery drain is based on said current average vehicle speed and said current degree of vehicle incline.

18. The method of claim 17, wherein said preset period of time is less than 5 minutes.

19. The method of claim 16, further comprising:

averaging said current vehicle speed over a preset period of time to yield a current average vehicle speed; and averaging said current degree of vehicle incline over said preset period of time to yield a current average vehicle incline, wherein said first battery drain is based on said current average vehicle speed and said current average vehicle incline.

20. The method of claim 19, wherein said preset period of time is less than 5 minutes.

21. The method of claim 1, said step of determining said second battery pack drain due to operation of said at least one user controllable auxiliary system further comprising applying a preset set of rules to said at least one user controllable auxiliary system.

22. The method of claim 21, said at least one user controllable auxiliary system comprised of a HVAC system coupled to a passenger cabin of said electric vehicle, said method further comprising:

determining a first ambient temperature corresponding to an environment external to said electric vehicle;

determining a second ambient temperature corresponding an internal temperature of said passenger cabin of said electric vehicle;

monitoring a user set HVAC temperature setting; and determining said second battery pack drain based on said first ambient temperature, said second ambient temperature, said user set HVAC temperature setting, and said preset set of rules.

* * * * *